United States Patent
Koyanagi et al.

[15] 3,706,705
[45] Dec. 19, 1972

[54] METHOD FOR SUSPENSION-POLYMERIZING VINYL CHLORIDE

[72] Inventors: Shunichi Koyanagi, Yokohama-shi, Kanagawa-ken; Hajime Kitamura, Itabashi-ku, Tokyo; Toshihide Shimizu, Kashima-gun, Ibaragi-ken, all of Japan

[73] Assignee: Shinetsu Chemical Company

[22] Filed: Aug. 26, 1971

[21] Appl. No.: 175,325

[30] Foreign Application Priority Data

June 3, 1971 Japan..............................46/38810

[52] U.S. Cl....260/78.5 CL, 260/85.5 XA, 260/86.3, 260/87.1, 260/87.5 R, 260/87.5 A, 260/87.5 C, 260/87.5 G, 260/87.7, 260/92.8 W
[51] Int. Cl.............C08f 1/11, C08f 3/30, C08f 15/2
[58] Field of Search.260/92.8 W, 78.5 CA, 85.5 XA, 260/86.3, 87.1, 87.5, 87.7

[56] References Cited

UNITED STATES PATENTS

| | | | |
|---|---|---|---|
| 2,981,724 | 4/1961 | Holdsworth et al............ | 260/92.8 W |
| 3,017,399 | 1/1962 | Holdsworth et al............ | 260/92.8 W |
| 3,042,665 | 7/1962 | Jankowiak et al............. | 260/92.8 W |
| 3,057,831 | 10/1962 | Holdsworth et al............ | 260/92.8 W |
| 3,205,204 | 9/1965 | Heckmaier et al............. | 260/92.8 W |
| 3,663,520 | 5/1972 | Balwe et al. ................... | 260/92.8 W |

*Primary Examiner*—James A. Seidleck
*Assistant Examiner*—John A. Donahue, Jr.
*Attorney*—Linda G. Bierman et al.

[57] ABSTRACT

Vinyl chloride or a mixture of vinyl monomers containing vinyl chloride as its main component, and an aqueous medium containing a protective colloidal substance and an anionic surface active agent are subjected to an initial stirring, in the presence of an oil-soluble catalyst. Before the rate degree of conversion reaches 30 percent, an inorganic polyvalent metal salt and/or an amine hydrochloride is added to the polymerization system. The anionic surface active agent is thereby rendered water-insoluble. The polymerization is then completed. A polymer having uniform particle size distribution, superior porosity and a high rate of plasticizer absorption is produced.

11 Claims, No Drawings

METHOD FOR SUSPENSION-POLYMERIZING VINYL CHLORIDE

This invention relates to a method for preparing polyvinyl chloride having a uniform particle size distribution, superior processability and a particularly high velocity of plasticizer absorption.

The suspension-polymerization of vinyl chloride or a mixture of vinyl monomers containing vinyl chloride as its main component, in an aqueous medium, together with at least one suspending agent selected from the group consisting of natural or semisynthetic water-soluble high molecular weight substances such as starch, gelatin, tragacanth gum, alkyl cellulose and hydroxyalkyl cellulose, synthetic water-soluble high molecular weight substances such as polyvinyl alcohol, polyacrylate, and vinyl acetate-maleic acid copolymer, and inorganic substances such as bentonite, talc, barium sulfate and calcium carbonate, and in the presence of an oil-soluble initiator, is well known. Polyvinyl chloride prepared by this method is widely employed in various fields. Of those factors which control the processability of polyvinyl chloride the most significant ones are its absorptivity of plasticizers as well as its gelling property. These in turn depend upon the uniformity of the particle size distribution and the porosity of the polymer. In view of this it is essential that the polyvinyl chloride have as uniform a particle size distribution and as superior a porosity as possible. Polyvinyl chloride prepared by known method of suspension-polymerization fails to meet these requirements.

The present invention is devoted to improvements in suspension-polymerization of vinyl chloride. The present inventors primarily concentrated their efforts upon improving porosity and the uniformity of particle size distribution.

An object of the present invention is to provide a method for preparing polyvinyl chloride which is free of the faults of the products prepared by the known methods. A further object of the invention is to prepare a polyvinyl chloride which rapidly absorbs a large quantity of plasticizer and which has an excellent particle size distribution. These objects are attained by the method given hereunder. In suspension-polymerizing vinyl chloride or a mixture of vinyl monomers containing vinyl chloride as its main component in an aqueous medium containing a protective colloidal substance and an anionic surface active agent, if an inorganic polyvalent metal salt and/or an amine hydrochloride is added to the polymerization system when the initial stirring is finished and before the rate (degree) of conversion reaches 30 percent, the anionic surface active agent will be converted into a water-insoluble substance, and upon subsequent completion of the polymerization a product having the desired properties will be obtained.

The method of the present invention shall now be described in greater detail. It is well known in the suspension-polymerization of vinyl chloride monomer to employ as a dispersing agent a water-insoluble substance prepared by reacting an inorganic polyvalent metal salt with an anionic surface active agent (cf. Japanese Patent Application 39–12119). However, this known method aims at preparing a polymer having large particles, e.g., at least 40 mesh, and so it is handicapped by (1) the monomer not being sufficiently dispersed into fine particles, (2) the polymer prepared not having uniform particle size distribution, and (3) the polymer prepared not having excellent plasticizer absorption with respect to amount absorbed and rate of absorption. Furthermore, control of the polymerization requires the exercise of a very high degree of skill. To overcome the difficulties, the known protective colloid may be employed in combination with an anionic surface active agent. However, this may cause a large amount of polymer scale to be deposited on the inner walls of the polymerization vessel. Additionally it may cause formation of coarse particles. Inevitably the scales will mix in with the product and degrade product quality. What is worse, is that it is difficult to remove the scales. Their removal requires much wasted labor.

According to the method of the present invention, in a first step, vinyl chloride monomer or a mixture of vinyl monomers containing vinyl chloride monomer as its main component is stirred to disperse it into an aqueous medium as fine particles. The aqueous medium contains dissolved therein a protective colloid and an anionic surface active agent. In a second step, the temperature of the system is raised to start the polymerization. Before the rate of conversion reaches 30 percent, a metal salt and/or an amine hydrochloride is added to the system. The metal salt and/or the amine salt may be added to the aqueous medium before the start of the polymerization. The anionic surface active agent will react with the metal salt and/or the amine salt and become water-insoluble. The particles of the monomer finely dispersed in the aqueous medium will be agglomerated by the synergetic action of the protective colloid and the insoluble reaction product of the anionic surface active agent and the metal salt and/or amine salt. This results in the production of polymer particles which are uniform in particle size and which have increased porosity. Additionally, the amount of scale deposited on the inner walls of the polymerization vessel will be remarkably reduced. It is important to note that if the anionic surface active agent, which is employed for the purpose of fully dispersing the vinyl chloride monomer or a mixture of vinyl monomers containing vinyl chloride monomer, is rendered water insoluble before the monomer(s) is dispersed, or after the rate of conversion reaches 30 percent, the above-given advantageous effects cannot be achieved. Therefore the addition of the metal salt and/or the amine salt, which renders the anionic surface active agent water-insoluble, must be conducted after the monomer(s) is sufficiently dispersed by the preparatory stirring in the aqueous medium containing the suspending agent and the anionic surface active agent and before the rate of conversion reaches 30 percent.

Thus, by the method of the present invention the anionic surface active agent present in the polymerization system is converted to a water-insoluble salt in the early stage of polymerization.

The inorganic polyvalent metal salt employed in the present invention is exemplified by chlorides, hydroxides, oxides, carbonates and acetates of calcium, magnesium, zinc, lead, tin, aluminum, and titanium. The amine hydrochloride is exemplified by p-toluidine hydrochloride, ethylenediamine hydrochloride, benzidine hydrochloride, and p-phenylenediamine hydrochloride. They are added in amounts sufficient to convert the anionic surface active agent present in the polymerization system into a water-insoluble salt. If the anionic surface active agent is only to be converted into a water-insoluble substance, said metal salt may be selected from the group consisting of the salts of iron, cobalt or nickel. However, retention of any of these salts in the end product polymer will exert an unfavorable effect on the thermal stability and initial color of the polymer. Therefore it is preferred that the metal salt be selected from among the other materials exemplified above rather than said salts of iron, cobalt or nickel.

The protective colloidal substance employed in practicing the method of the present invention is exemplified by cellulose ethers such as methyl cellulose, ethyl cellulose, hydroxyethyl cellulose, hydroxypropyl cellulose, hydroxypropyl methylcellulose and carboxy methylcellulose; polyvinyl alcohol; partially saponified polyvinyl acetate; styrene-maleic anhydride copolymer; vinyl acetate-maleic anhydride copolymer; partially saponified substance of polyacrylic ester or methacrylic ester; gelatin, and starch. The anionic surface active agent is exemplified by fatty acid soaps, such as the potassium, sodium or ammonium salt of higher fatty acids such as oleic acid and lauric acid; higher alcohol ester sulphates such as sodium lauryl sulfate and ammonium lauryl sulfate; alkylaryl sulfonates such as dodecylbenzene sodium sulfonate and dodecylnaphthalene sodium sulfonate; dialkylsulfosuccinate such as dioctylsulfosuccinate; sulfonates of naphthaleneformalin condensates; and alkylsulphonates. The protective colloidal substance and the anionic surface active agent are employed in a weight ratio of respectively from 1:4 to 4:1, preferably from 1:1 to 1:4. The total amount of protective colloidal substance and anionic surface active agent employed is generally from 0.01 to 1.0 percent by weight, preferably from 0.1 to 0.5 percent by weight, based on the weight of the monomer or the mixture of monomers. The ratio of the protective colloid to the anionic surface active agent should be in the above-given range. If too small an amount of anionic surface active agent is used the expected effect will not be obtained. On the other hand the use of too large an amount of anionic surface active agent results in the disadvantageous production of a product polymer having coarse particles and a very inferior particle size distribution. Such a product has poor processability.

The catalyst employed in practicing the method of the instant invention is exemplified by ordinary oil-soluble catalysts such as organic peroxides, e.g., benzoyl peroxide, caproyl peroxide, lauroyl peroxide, 2,4-dichlorobenzoyl peroxide, diisopropyl peroxydicarbonate, di-2 ethylhexyl peroxydicarbonate, dicyclohexyl peroxydicarbonate, ter-butyl peroxypivalate, acetylcyclohexyl sulfonyl peroxide, and azo compounds, e.g., $\alpha,\alpha'$-azobisisobutyronitrile, $\alpha,\alpha'$-azobis 2,4-dimethylvaleronitrile and azobis-4-methoxy-2,4-dimethylvaleronitrile. In the polymerization of the present invention conventional methods are employed in the charging of the monomer into the polymerization vessel (successive addition) and in the stirring. The polymerization time employed is likewise conventional. For example, the polymerization system may be polymerized at 30°–70° C with stirring.

Although the method of the present invention has heretofore been described mostly with regard to the homopolymerization of vinyl chloride, it may likewise be applied to the preparation of copolymers from a mixture of monomers containing as its main component vinyl chloride. The monomers copolymerizable with vinyl chloride are $\alpha$-olefins such as ethylene and propylene; vinyl esters such as vinyl acetate and vinyl stearate; vinyl ethers such as methyl vinyl ether and cetyl vinyl ether; acrylic acid; methacrylic acid and their esters; vinyl halides, except vinyl chloride, such as vinyl bromide and vinyl fluoride; aromatic vinyl compounds such as $\alpha$-methylstyrene; maleic acid and its anhydride; fumaric acid and its ester (e.g., dioctyl fumarate ester); vinylidene chloride and acrylonitrile. From 50 to 1 part by weight of such monomers are to be mixed with from 50 to 99 parts by weight of vinyl chloride.

In the following examples parts are all parts by weight and the physical properties of the polymers prepared were tested by the following methods.

1. Amount of scale deposited ($g/cm^2$):
   The amount of scale deposited on the walls of the polymerization vessel is given as $g/cm^2$.
2. Amount of plasticizer absorbed (percent):
   Two times its weight of dioctyl phthalate (DOP) was added to the polyvinylchloride (PVC). The resultant mixture was allowed to stand at room temperature for 1 hour. Then it was placed into a centrifugal separator equipped at its bottom with a tube for discharging DOP. The bottom of tube was filled with fiber glass. The centrifugal separator was operated for one hour at 3,000 rpm. The excess DOP was removed, and PVC which had absorbed DOP was weighed. The ratio (in percent) of DOP absorbed by 100 parts of PVC was determined from the ratio of the weight of PVC before it had absorbed DOP to the weight of PVC after it had absorbed DOP.
3. Velocity at which the plasticizer was absorbed (minutes):
   250 g of PVC were charged into a 500 cc jacketed mixer equipped with a sigma ($\sigma$)-type stirrer. While the temperature of the jacket was kept at 80° C the PVC was stirred at 30 rpm for 4 minutes. Then 125 g of DOP were added to the PVC and the operation of the mixer was continued. The time required for the stirrer to show the maximum value of torque was used to show the velocity at which the plasticizer was absorbed by the PVC.
4. Gelling velocity (minutes):
   0.5 part of tribasic lead stearate, 0.7 part of barium stearate and 2.5 parts of stearic acid were added to 100 parts of PVC. 65g of the resultant mixture were introduced into a Brabender-plastograph equipped with a roller-type stirrer and was kneaded therein at 180° C. The time required for the kneading torque to reach the maximum value was employed to show the gelling velocity of the PVC.
5. Fish eye (pieces):
   A mixture consisting of 100 parts of PVC, 50 parts of DOP, 1 part of dibutyltin dilaurate, 1 part of cetyl alcohol, 0.25 part of titanium white, and 0.05 part of carbon black was kneaded on a hot roll of 150° C for 7 minutes, and then formed into a 0.2 mm thick sheet. Light was passed through the sheet and the number of fish eyes per 100 cm² of the sheet was used to show the fish eyes of the PVC.

6. Softening temperature (softening point) (°C):

A mixture of 100 parts of PVC, 3 parts of dibutyltin maleate, and 0.5 part of stearic acid was kneaded on a hot roll of 170° C for 10 minutes, and then pressed for 10 minutes, at 170° C, and under a pressure of 200 kg/cm² to produce a sheet. The resultant sheet was tested with a flexibility temperature tester, in accordance with ASTM D 64.856. The value obtained was employed to show the softening point of the PVC.

7. Absorptivity of the stabilizer(percent):

A mixture of 100 parts of PVC and 30 parts of dibutyltin dilaurate was aged for 30 minutes. An additional hour was allowed to pass. Then the mixture was put in a centrifugal separator to remove the unabsorbed dibutyltin dilaurate. The amount (percent) of dibutyltin dilaurate absorbed by the PVC was employed to denote the absorptivity by PVC of the stabilizer.

EXAMPLE 1

200 g of partially saponified polyvinyl acetate (saponification rate: 81 mole percent), 37.5 g of diisopropyl peroxydicarbonate, 200 g of lauryl sodium sulfate, 500 liters of water and 250 kg of vinyl chloride monomer were charged into a stainless steel polymerization vessel having an inner capacity of 1,000 liters. The resultant mixture was subjected to a preparatory stirring for 30 minutes. Then the polymerization was conducted at 57° C for 9 hours. In the course of the preparatory stirring and the polymerization, CaCl₂ solution (12.5 g of calcium chloride dissolved in 2.5 liters of water) was added to the polymerization system at an appointed time. This time was varied as shown in the following Table 1. The physical properties of PVC so obtained are also given in Table 1. (Ex Nos. 1 and 6 are controls.)

TABLE 1.

| Ex. No. | 1 Before preparatory stirring | 2 At the start of polymerization | 3 When the rate of conversion was 10% | 4 When the rate of conversion was 18% | 5 When the rate of conversion was 26% | 6 When the rate of conversion was 39% |
|---|---|---|---|---|---|---|
| Time at which CaCl₂ solution was added | | | | | | |
| Amount of scale deposited on the inner walls of the polymerization vessel (g/m²) | 1320 | 40 | 28 | 23 | 18 | 250 |
| Particle size distribution. Mesh pass(%) | 6041.8 10029.4 20018.9 | 100 41.8 4.9 | 100 78.6 2.8 | 100 50.0 1.2 | 100 40.3 0.5 | 77.3 21.0 1.2 |
| Amount of DOP absorbed (%) | 16.9 | 30.3 | 34.6 | 33.3 | 38.0 | 20.3 |
| Velocity at which DOP was absorbed (min.) | Over 20 | 14 | 12 | 12 | 9 | 20 |
| Velocity at which PVC gelled(min.) | Over 40 | 17 | 16 | 16 | 15 | 22 |
| Fish eyes (pieces) | Over 500 | 16 | 10 | 9 | 8 | 53 |

EXAMPLE 2

100 g of partially saponified polyvinyl acetate (saponification rate: 81 mole percent), 75 g of hydroxypropyl methylcellulose (viscosity of 2 percent aqueous solution of hydroxy-propyl methylcellulose at 20° C: 50 cps and content of hydroxypropyl radicals: 9 percent), and 125 g of sodium octyl sulfosuccinate were polymerized in a polymerization vessel similar to the one employed in Example 1. In the course of the polymerization, and in all experiments with the exception of No. 13, a variety of additives as given in Table 2 were added to the polymerization system when the rate of conversion was 13–15 percent. The physical properties of PVC so obtained are given in the following Table 2. (In Ex. No. 13 (control), the additive was added before the preparatory stirring was conducted.)

TABLE 2

| Ex. No. | 7 | 8 | 9 | 10 | 11 | 12 | 13 |
|---|---|---|---|---|---|---|---|
| Additive Kind | p-toluidine hydrochloride | ethylened-iamine hydrochloride | benzidine hydrochloride | calcium acetate | calcium hydroxide | aluminum chloride | ethylened-iamine hydrochloride |
| Amount (g) | 125 | 62 | 62 | 62 | 62 | 44 | 62 |
| Amount of scale deposited on the inner walls of the polymerization vessel (g/m²) | 11 | 8 | 4 | 18 | 0.2 | 18 | 1490 |
| Particle size distribution. Mesh pass(%) 60 100 200 | 100 60.3 10.3 | 100 79.2 5.2 | 100 70.5 2.4 | 100 60.2 4.3 | 100 55.4 1.2 | 100 57.8 5.0 | 61.3 33.3 10.3 |
| Amount of DOP absorbed (%) | 35.1 | 31.6 | 30.3 | 27.1 | 28.3 | 32.5 | 19.3 |
| Velocity at which DOP was absorbed (min.) | 10 | 12 | 12 | 13 | 13 | 12 | 19 |
| Fish eyes (pieces) | 8 | 7 | 6 | 9 | 9 | 4 | 49 |

EXAMPLE 3

70 parts of vinyl chloride, 30 parts of vinyl acetate, 200 parts of water, 0.03 part of axobis 2,4-dimethylvaleronitrile, 2.0 parts of trichloroethylene and a dispersing agent as given in Table 3 (wherein MC means methylcellulose and DBS means dodecylbenzene sodium sulfonate) were charged into a glasslined polymerization vessel having an inner capacity of 50 liters. The resultant mixture was then subjected to a preparatory stirring for 90 minutes. Polymerization was started at 58° C. In the course of the polymerization, barium chloride ($BaCl_2$) was added as shown in the following Table 3 and the polymerization was conducted for 15 hours. The copolymer thus prepared was dehydrated and dried. Its physical properties are also given in Table 3. (Ex. Nos. 14, 15, 16 and 21 are controls.)

TABLE 3.

| Ex. No. | 14 | 15 | 16 | 17 | 18 | 19 | 20 | 21 |
|---|---|---|---|---|---|---|---|---|
| MC (part) | 0.1 | — | 0.3 | 0.03 | 0.09 | 0.51 | 0.21 | 0.27 |
| DBS (part) | 0.2 | 0.3 | — | 0.27 | 0.21 | 0.15 | 0.09 | 0.03 |
| Amount of $BaCl_2$ added (part) | 0.1 | 0.15 | — | 0.14 | 0.11 | 0.08 | 0.05 | 0.02 |
| Time at which $BaCl_2$ was added | Before preparatory stirring | Before preparatory stirring | — | When the rate of conversion was 20% | When the rate of conversion was 20% | When the rate of conversion was 20% | when the rate of conversion was 20% | when the rate of conversion was 20% |
| Amount of scale deposited on the inner walls of the polymerization vessel (g/m²) | 1480 | 2320 | 185 | 211 | 18 | 15 | 20 | 230 |
| particle size distribution. Mesh pass (%) 60 | 50.2 | 20.8 | 60.5 | 85.4 | 100 | 100 | 98.3 | 81.8 |
| 80 | 48.4 | 18.1 | 51.4 | 71.4 | 89.2 | 95.4 | 69.2 | 64.7 |
| 100 | 40.9 | 15.9 | 42.9 | 64.3 | 66.6 | 89.2 | 59.8 | 51.6 |
| 115 | 38.2 | 10.2 | 40.0 | 18.5 | 42.3 | 66.3 | 42.3 | 44.8 |
| 150 | 31.8 | 9.3 | 38.1 | 4.9 | 19.8 | 40.5 | 22.2 | 20.3 |
| 200 | 29.9 | 8.4 | 35.4 | 3.2 | 8.5 | 18.4 | 11.4 | 11.5 |
| Amount of the stabilizing agent absorbed (%) | 5.5 | 10.5 | 4.2 | 16.3 | 17.0 | 16.8 | 13.0 | 8.0 |

The polymerization degree and the softening point of the copolymers obtained in these experiments were invariably about 400 and 51.6°–51.9° C, respectively. This proves that by the method of the present invention, even if the polymerization is carried out at a temperature higher than the softening point of the polymer to be prepared, at which temperature the particles are apt to be agglomerated and fused, such agglomeration and fusion can be avoided. Furthermore as shown in the table the product which is obtained possesses superior particle size distribution and porosity.

What is claimed is:

1. In a method for suspension polymerization of vinyl chloride or a mixture of vinyl chloride and another monomer copolymerizable with the vinyl chloride, in an aqueous polymerization system containing an oil-soluble catalyst, a protective colloid and an anionic surfactant selected from the group consisting of fatty acid soap, higher alcohol ester sulfate, alkyl aryl sulfonate, dodecyl naphthalene sodium sulfonate, dialkyl sulfasuccinate, sulfonate of naphthalene-formalin condensate and alkyl sulphonate the improvement which comprises dispersing the vinyl chloride in said polymerization system, then adding to the polymerization system before the degree of conversion reaches 30 percent, an inorganic polyvalent metal salt and/or an amine hydrochloride in an amount sufficient to produce a reaction product of said surfactant which is water-insoluble, said inorganic metal salt being a chloride, hydroxide, oxide, carbonate or acetate of calcium, magnesium, zinc, lead, tin, aluminum, titanium iron, cobalt or nickel, and the amine hydrochloride is p-toluidine hydrochloride, ethylene diamine hydrochloride, benzidine hydrochloride or p-phenylene diamine hydrochloride, whereby on completion of the polymerization a polymer having uniform particle size distribution, superior processability and a high rate of plasticizer absorption is produced.

2. The method as claimed in claim 1 wherein the inorganic polyvalent metal salt, the amine hydrochloride or the inorganic polyvalent metal salt and the amine hydrochloride is added before the start of the polymerization.

3. The method as claimed in claim 1 wherein said inorganic polyvalent metal salt is a chloride, hydroxide, oxide, carbonate or acetate of calcium, magnesium, zinc, lead, tin, aluminum or titanium.

4. The method as claimed in claim 1 wherein the protective colloid and the anionic surfactant are present in a weight ratio of 1:4 to 4:1 respectively and the total amount of the protective colloid and the anionic surfactant employed is 0.01 to 1.0 percent by weight, based on monomer weight.

5. The method as claimed in claim 1 wherein the protective colloid and the anionic surfactant are present in a weight ratio of 1:1 to 1:4 respectively and the total amount of the protective colloid and the anionic surfactant employed is 0.1 to 0.5 percent by weight, based on monomer weight.

6. The method as claimed in claim 1 wherein said catalyst is an organic peroxide selected from the group consisting of benzoyl peroxide, caproyl peroxide, lauroyl peroxide, 2,4-dichlorobenzoyl peroxide, diisopropyl peroxy-dicarbonate, di-2 ethylhexyl peroxydicarbonate, dicyclohexyl peroxydicarbonate, ter-butyl peroxypivalate, acetylcyclohexyl sulfonyl peroxide, or an azo compound selected from the group consisting of $\alpha,\alpha'$-azobisisobutyronitrile, $\alpha,\alpha'$-azobis 2,4-dimethylvaleronitrile and azobis-4-methoxy-2,4-dimethyl-valeronitrile.

7. The method as claimed in claim 1 wherein the protective colloid is selected from the group consisting of cellulose ethers, polyvinyl alcohol, partially saponified polyvinyl acetate, styrene-maleic anhydride copolymer, vinyl acetate-maleic anhydride copolymer, partially saponified substance of polyacrylic ester or methacrylic ester, gelatin and starch.

8. The process as claimed in claim 7 wherein said cellulose ethers are methyl cellulose, ethyl cellulose, hydroxyethyl cellulose, hydroxypropyl cellulose, hydroxy-propyl methylcellulose and carboxy methylcellulose.

9. The process as claimed in claim 1 wherein said anionic surfactant is selected from the group consisting of the potassium, sodium or ammonium salt of oleic or lauric acid, sodium lauryl sulfate, ammonium lauryl sulfate, dodecylbenzene sodium sulfonate, dodecylnaphthalene sodium sulfonate, dioctyl sulfosuccinate.

10. The process as claimed in claim 1 wherein said another monomer is selected from the group consisting of α-olefins, vinyl esters, vinyl ethers, acrylic acid, methacrylic acid, acrylic acid esters, methacrylic acid esters, vinyl halides excepting vinyl chloride, aromatic vinyl compounds, maleic acid, maleic acid anhydride, fumaric acid, fumaric acid ester, vinylidene chloride and acrylonitrile and said mixture of vinyl chloride and another monomer contains from 50 to 1 part by weight of said another monomer and 50 to 99 parts by weight of said vinyl chloride.

11. The process as claimed in claim 9 wherein said α-olefins are ethylene and propylene; said vinyl esters are vinyl acetate and vinyl stearate; said vinyl ethers are methyl vinyl ether and cetyl vinyl ether; said vinyl halides are vinyl bromide and vinyl fluoride; said aromatic vinyl compounds are α-methyl styrene and said fumaric acid ester is dioctyl fumarate ester.

* * * * *